United States Patent
Alattar et al.

(10) Patent No.: US 7,567,721 B2
(45) Date of Patent: Jul. 28, 2009

(54) DIGITAL WATERMARKING OF LOW BIT RATE VIDEO

(75) Inventors: Adnan M. Alattar, Tigard, OR (US); Eugene T. Lin, West Lafayette, IN (US); Mehmet Celik, Rochester, NY (US)

(73) Assignee: Digimarc Corporation, Beaverton, OR (US)

( * ) Notice: Subject to any disclaimer, the term of this patent is extended or adjusted under 35 U.S.C. 154(b) by 804 days.

(21) Appl. No.: 10/636,505

(22) Filed: Aug. 6, 2003

(65) Prior Publication Data

US 2004/0125952 A1    Jul. 1, 2004

Related U.S. Application Data

(63) Continuation-in-part of application No. 10/350,276, filed on Jan. 22, 2003, now Pat. No. 7,020,304.

(60) Provisional application No. 60/434,823, filed on Dec. 18, 2002, provisional application No. 60/428,485, filed on Nov. 21, 2002, provisional application No. 60/404,038, filed on Aug. 15, 2002, provisional application No. 60/351,565, filed on Jan. 22, 2002.

(51) Int. Cl.
*G06K 9/00* (2006.01)
*G06K 9/36* (2006.01)
*G06K 9/46* (2006.01)
*G06K 9/64* (2006.01)

(52) U.S. Cl. ............... 382/248; 382/100; 382/239; 382/278

(58) Field of Classification Search ........ 382/100, 382/202, 239, 269, 248, 276, 278
See application file for complete search history.

(56) References Cited

U.S. PATENT DOCUMENTS

| | | | |
|---|---|---|---|
| 4,939,515 | A | 7/1990 | Adelson |
| 4,969,041 | A | 11/1990 | O'Grady et al. |
| 5,319,735 | A | 6/1994 | Preuss et al. |
| 5,337,361 | A | 8/1994 | Wang |
| 5,530,751 | A | 6/1996 | Morris |
| 5,530,759 | A | 6/1996 | Braudaway et al. |
| 5,613,004 | A | 3/1997 | Cooperman et al. |
| 5,636,292 | A | 6/1997 | Rhoads |
| 5,646,997 | A | 7/1997 | Barton |
| 5,652,626 | A | 7/1997 | Kawakami et al. |

(Continued)

FOREIGN PATENT DOCUMENTS

DE    29 43 436    5/1981

(Continued)

OTHER PUBLICATIONS

WordPackage 8: Watermarking, pp. 1-46, Jun. 1995. cited by examiner . "Access Control and COpyright Protection for Images, WorkPackage 8: Watermarking," Jun. 30, 1995, 46 pages.

(Continued)

*Primary Examiner*—Wesley Tucker

(57) ABSTRACT

Methods for embedding digital watermarks in compressed video include perceptual adapting a digital watermark in predicted and non-predicted data based on block activity derived from the compressed video stream, embedding in predicted objects in a video stream having separately compressed video objects, and bit rate control of watermarked video.

12 Claims, 8 Drawing Sheets

U.S. PATENT DOCUMENTS

| | | | |
|---|---|---|---|
| 5,659,726 A | 8/1997 | Sandford, II et al. |
| 5,663,766 A | 9/1997 | Sizer |
| 5,664,018 A | 9/1997 | Leighton |
| 5,668,898 A | 9/1997 | Tatsuta |
| 5,687,191 A | 11/1997 | Lee et al. |
| 5,687,236 A | 11/1997 | Moskowitz et al. |
| 5,710,834 A | 1/1998 | Rhoads |
| 5,721,788 A | 2/1998 | Powell |
| 5,727,092 A | 3/1998 | Sandford et al. |
| 5,745,604 A | 4/1998 | Rhoads |
| 5,748,783 A | 5/1998 | Rhoads |
| 5,768,426 A | 6/1998 | Rhoads |
| 5,778,102 A | 7/1998 | Sandford et al. |
| 5,799,092 A | 8/1998 | Kristol et al. |
| 5,809,139 A | 9/1998 | Girod et al. |
| 5,832,119 A | 11/1998 | Rhoads |
| 5,835,639 A | 11/1998 | Honsinger et al. |
| 5,841,886 A | 11/1998 | Rhoads |
| 5,848,155 A | 12/1998 | Cox et al. |
| 5,857,038 A | 1/1999 | Owada et al. |
| 5,859,920 A | 1/1999 | Daly et al. |
| 5,862,260 A | 1/1999 | Rhoads |
| 5,901,178 A | 5/1999 | Lee et al. |
| 5,903,892 A | 5/1999 | Hoffert |
| 5,905,819 A | 5/1999 | Daly |
| 5,915,027 A | 6/1999 | Cox et al. |
| 5,915,044 A | 6/1999 | Gardos et al. |
| 5,930,369 A | 7/1999 | Cox |
| 5,930,377 A | 7/1999 | Powell et al. |
| 5,933,798 A | 8/1999 | Linnartz |
| 5,946,414 A | 8/1999 | Cass et al. |
| 5,949,055 A | 9/1999 | Fleet et al. |
| 5,949,885 A | 9/1999 | Leighton |
| 5,956,716 A | 9/1999 | Kenner |
| 5,960,081 A | 9/1999 | Vynne |
| 5,983,176 A | 11/1999 | Hoffert |
| 5,987,459 A | 11/1999 | Swanson |
| 6,005,643 A | 12/1999 | Morimoto et al. |
| 6,018,593 A | 1/2000 | Yamagata |
| 6,026,193 A | 2/2000 | Rhoads |
| 6,031,914 A | 2/2000 | Tewfik et al. |
| 6,037,984 A | 3/2000 | Isnardi |
| 6,061,451 A | 5/2000 | Muratani |
| 6,061,793 A | 5/2000 | Tewfik |
| 6,069,914 A | 5/2000 | Cox |
| 6,094,722 A | 7/2000 | Astola |
| 6,104,826 A | 8/2000 | Nakagawa |
| 6,108,434 A | 8/2000 | Cox |
| 6,122,403 A | 9/2000 | Rhoads |
| 6,181,813 B1 | 1/2001 | Fan |
| 6,192,139 B1 * | 2/2001 | Tao ............................ 382/100 |
| 6,208,745 B1 | 3/2001 | Florencio et al. |
| 6,211,919 B1 | 4/2001 | Zink et al. |
| 6,226,387 B1 | 5/2001 | Tewfik et al. |
| 6,229,924 B1 | 5/2001 | Rhoads et al. |
| 6,266,419 B1 | 7/2001 | Lacy et al. |
| 6,266,430 B1 | 7/2001 | Rhoads |
| 6,282,299 B1 | 8/2001 | Tewfik et al. |
| 6,285,776 B1 | 9/2001 | Rhoads |
| 6,314,192 B1 | 11/2001 | Chen |
| 6,332,030 B1 | 12/2001 | Manjunath et al. |
| 6,334,187 B1 | 12/2001 | Kadono |
| 6,343,138 B1 | 1/2002 | Rhoads |
| 6,345,104 B1 | 2/2002 | Rhoads |
| 6,359,985 B1 | 3/2002 | Koch et al. |
| 6,373,965 B1 | 4/2002 | Liang |
| 6,385,329 B1 | 5/2002 | Sharma et al. |
| 6,385,330 B1 | 5/2002 | Powell et al. |
| 6,408,082 B1 | 6/2002 | Rhoads et al. |
| 6,411,392 B1 | 6/2002 | Bender et al. |
| 6,411,725 B1 | 6/2002 | Rhoads |
| 6,424,725 B1 | 7/2002 | Rhoads et al. |
| 6,424,726 B2 | 7/2002 | Nakano et al. |
| 6,449,379 B1 | 9/2002 | Rhoads |
| 6,483,927 B2 | 11/2002 | Brunk et al. |
| 6,522,771 B2 | 2/2003 | Rhoads |
| 6,563,936 B2 | 5/2003 | Brill et al. |
| 6,567,533 B1 | 5/2003 | Rhoads |
| 6,580,808 B2 | 6/2003 | Rhoads |
| 6,580,819 B1 | 6/2003 | Rhoads |
| 6,608,919 B1 | 8/2003 | Alattar |
| 6,614,914 B1 | 9/2003 | Rhoads et al. |
| 6,625,297 B1 | 9/2003 | Bradley |
| 6,647,128 B1 | 11/2003 | Rhoads |
| 6,674,873 B1 * | 1/2004 | Donescu et al. ............. 382/100 |
| 6,674,876 B1 | 1/2004 | Hannigan et al. |
| 6,707,930 B2 | 3/2004 | Kalker et al. |
| 6,711,276 B1 | 3/2004 | Yoshiura et al. |
| 6,754,377 B2 | 6/2004 | Rhoads |
| 6,771,795 B1 | 8/2004 | Isnardi |
| 6,798,894 B2 | 9/2004 | Rhoads |
| 6,823,075 B2 | 11/2004 | Perry |
| 6,959,098 B1 | 10/2005 | Alattar |
| 6,961,444 B2 | 11/2005 | Levy |
| 6,973,197 B2 | 12/2005 | Miller |
| 6,975,744 B2 | 12/2005 | Sharma et al. |
| 6,993,153 B2 | 1/2006 | Bradley |
| 6,999,598 B2 | 2/2006 | Foote et al. |
| 7,130,443 B1 | 10/2006 | Werner et al. |
| 2001/0019611 A1 | 9/2001 | Hilton |
| 2001/0053237 A1 | 12/2001 | Hashimoto et al. |
| 2002/0076083 A1 | 6/2002 | Levy |
| 2002/0108043 A1 | 8/2002 | Tanaka |
| 2002/0164046 A1 | 11/2002 | Walker et al. |
| 2002/0172394 A1 | 11/2002 | Venkatesan et al. |
| 2002/0172395 A1 | 11/2002 | Foote et al. |
| 2002/0191810 A1 | 12/2002 | Fudge et al. |
| 2003/0021439 A1 | 1/2003 | Lubin et al |
| 2003/0059082 A1 | 3/2003 | Suzuki et al. |
| 2003/0123659 A1 | 7/2003 | Forstrom et al. |
| 2003/0185417 A1 | 10/2003 | Alattar et al. |
| 2004/0125952 A1 | 7/2004 | Alattar et al. |
| 2006/0120559 A1 | 6/2006 | Levy |

FOREIGN PATENT DOCUMENTS

| | | |
|---|---|---|
| EP | 0824821 | 2/1998 |
| EP | 1217840 | 6/2002 |
| JP | 3-185585 | 8/1991 |
| WO | WO9827510 | 6/1998 |
| WO | WO02060182 | 8/2003 |

OTHER PUBLICATIONS

Arena et al., "Digital watermarking applied to MPEG-2 coded video sequences exploiting space and frequency masking," *Proceedings of the IEEE Internal Conference on Image Processing '00*, Vancouver, Canada, 2000.

Barni et al., "Object watermarking for MPEG-4 video streams copyright protection," *Proceedings of the SPIE Security and Watermarking of Multimedia Contents II*, Wong, Delp, Editors, vol. 3671, San Jose, California, Jan. 2000, pp. 465-476.

Bas et al., "A new video-object watermarking scheme robust to object manipulation," *Proceedings of the IEEE International Conference on Image Processing '01*, Thessaloniki, Greece, 2001, pp. 526-529.

Basso, et al., "Study of MPEG-2 coding performance based on perceptual quality metric," *Proceedings of the 1996 Picture Coding Symposium*, Australia, Mar. 1996, pp. 263-268.

Bender, "Techniques for Data Hiding," SPIE vol. 2420, pp. 164-173, 1995.

Bors et al., "Image Watermarking Using DCT Domain Constraints," Proc. IEEE Int. Conf. on Image Processing, vol. 3, Sep. 1996, pp. 231-234.

Brassil et al., "Electronic Marking and Identification Techniques to Discourage Document Copying", Proceedings of INFOCOM '94 Conference on Computer, IEEE Commun. Soc Conference, Jun. 12-16, 1994, pp. 1278-1287.

Burgett et al., "A Novel Method for Copyright Labeling Digitized Image Data," Sep. 1994, 12 pages.

Cox et al., "Secure spread spectrum watermarking for multimedia," *IEEE Transactions on Image Processing*, vol. 6, No. 12, pp. 1673-1687, Dec. 1997.

Deguillaume et al., "Robust 3D DFT Video Watermarking," *Proc. SPIE vol. 3657: Security and Watermarking of Multimedia Contents*, Jan. 1999, pp. 113-124.

Dittmann, Jana et al., "Robust MPEG Video Watermarking Technologies", ACM Multimedia '98, Bristol, UK, 1998, pp. 71-80.

Echizen et al., "General Quality Maintenance Module for Motion Picture Watermarking," *IEEE Trans. on Consumer Electronics*, vol. 45, No. 4, Nov. 1999, pp. 1150-1158.

Hartung et al., Digital Watermarking of Raw and Compressed Video, Proc. SPIE 2952, Digital Compression Technologies and Systems for Video Communications, Oct. 1996, pp. 205-213.

Hartung et al., "Multimedia watermarking techniques," *Proceedings of the IEEE*, vol. 87, No. 7, pp. 1079-1107, Jul. 1999.

Hartung, et al., "Watermarking of uncompressed and compressed video," *Signal Processing*, vol. 66, No. 3, pp. 283-301, May 1998.

Herrigel et al., "The watermark template attack," *Proceedings of the SPIE Security and Watermarking of Multimedia Contents III*, Wong, Delp, Editors, vol. 4314, San Jose, California, Jan. 22-25, 2001, pp. 394-405.

Highwater FBI, "Copyright Protection for Digital Images, Digital Fingerprinting from FBI," Brochure, 4 pgs.1995.

Holliman et al., "Adaptive Public Watermarking of DCT-Based Compresed Images," SPIE vol. 3312, Dec. 1997, pp. 284-295.

JPEG Group's JPEG Software (release 4), FTP.CSUA.Berekeley. EDU/PUB/Cypherpunks/Applications/JSTEG/JPEG. Announcement.GZ, Jun. 1993, 2 pages.

Kalker et al., "A video watermarking system for broadcast monitoring," *Proceedings of the SPIE Security and Watermarking of Multimedia Contents*, vol. 3657, Jan. 25-27, 1999, San Jose, California, pp. 103-112.

Kawaguchi et al., "Principle and Applications of BPCS-Steganography," SPIE vol. 3528: Multimedia Systems and Applications, Nov. 2-4, 1998, pp. 464-473.

Kim et al., "An Object-based Video Watermarking," *Proc. Intl. Conf. on Consumer Electronics*, Jun. 1999, pp. 100-101.

Koch et al., "Copyright Protection for Multimedia Data," Proc. Of the Int. Conf. On Digital Media and Electronic Publishing, Leeds, U.K., Dec. 1994, 15 pages.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Langelaar et al., "Watermarking digital image and video data: A state-of-the-art overview," *IEEE Signal Processing Magazine*, vol. 17, No. 5, pp. 20-46, Sep. 2000.

Langelaar et al., "Robust Labeling Methods for Copy Protection of Images," Proc. SPIE Electronic Imaging '97: Storage and Retrieval of Image and Video Databases V, Feb. 1997, pp. 298-309.

Langelaar et al., "Copy Protection for Multimedia Data based on Labeling Techniques," Jun. 1996, 9 pages.

Langelaar et al., "Watermarking by DCT Coefficient Removal: A Statistical Approach to Optimal Parameter Settings," SPIE vol. 3657, Jan. 1999, pp. 2-13.

Langelaar et al., "Optimal differential energy watermarking of DCT encoded images and video," *IEEE Transactions on Image Processing*, vol. 10, No. 1, pp. 148-158, Jan. 2001.

Lee et al., "Adaptive Video Watermarking Using Motion Information," *Proc. SPIE vol. 3971: Security and Watermarking of Multimedia Contents II*, Jan. 2000, pp. 209-216.

Lin et al., "Streaming video and rate scalable compressiion: What are the challenges for watermarking?", *Proceedings of the SPIE Security and Watermarking of Multimedia Contents III*, Wong, Delp, Editors, vol. 4314, Jan. 22-25, 2001, San Jose, California, pp. 116-127.

Lin et al., "Temporal synchronization in video watermarking," *Proceedings of the SPIE Security and Watermarking of Multimedia Contents IV*, Wong, Delp, Editors, vol. 4675, Jan. 21-24, 2002, San Jose, California, pp. 478-490.

Lin, et al., "Rotation, scale, and translation resilient watermarking for images," *IEEE Transactions on Image Processing*, vol. 10, No. 5, pp. 767-782, May 2001.

Matsui et al., "Video-Steganography: How to Secretly Embed a Signature in a Picture," IMA Intellectual Property Project Proceedings, Jan. 1994, vol. 1, Issue 1, pp. 187-205.

Mora-Jimenez et al., "A new spread spectrum watermarking method with self-synchronization capabilities," *Proceedings of the IEEE International Conference on Image Processing '00*, Vancouver, Canada, Sep. 10-13, 2000.

Nicholson et al., "Watermarking in the MPEG4 context," *European Conference on Multimedia Applications Services and Techniques*, Madrid, Spain, May 1999, pp. 472-492.

Ogihara et al, "Data Embedding into Pictorial Images with Less Distortion Using Discrete Cosine Transform," Proceedings of ICPR 96, IEEE, pp. 675-679.

O'Ruanaidh, "Rotation, Scale and Translation Invariant Digital Image Watermarking," Signal Processing, pp. 2-15, May 1, 1998.

O'Ruanaidh, "Rotation, Scale and Translation Invariant Digital Image Watermarking," 1997 IEEE, pp. 536-539.

J. 'O Ruanaidh and G. Csurka, "A bayesian approach to spread spectrum watermark detection and secure copyright protection for digital image libraries", *Proceedings of the IEEE Conference on Computer Vision and Pattern Recognition*, Fort Collins, Colorado, USA, Jun. 1999.

Pereira et al., "Template based recovery of Fourier-based watermarks using log-polar and log-log maps," *Proceedings of the IEEE International Conference on Multimedia Computing and Systems*, vol. 1, 1999, pp. 870-874.

Piva et al., "A DWT-Based Object Watermarking System for MPEG-4 Video Streams," *Proceedings of the IEEE International Conference on Image Processing '00*, vol. 3, Vancouver, Canada, 2000, pp. 5-8.

Sheng, "Experiments on Pattern Recognition Using Invariant Fourier-Mellin Descriptors," Journal of Optical Society of America, vol. 3, No. 6, pp. 771-776, 1986.

Sullivan et al., "Rate-distortion optimization for video compression," *IEEE Signal Processing Magazine*, vol. 15, No. 6, Nov. 1998, pp. 74-90.

Suthaharan et al. "Perceptually Tuned Video Watermarking Scheme using Motion Entropy Masking," *Proc. IEEE Region 10 Conf.*, Sep. 1999, pp. 182-185.

Swanson et al., "Multimedia data-embedding and watermarking technologies," *Proceedings of the IEEE*, vol. 86, No. 6, pp. 1064-1087, Jun. 1998.

Swanson et al., "Object-Based Transparent Video Watermarking," *Proc. IEEE First Workshop on Multimedia Signal Processing*, Jun. 1997, pp. 369-374.

Swanson et al., "Multiresolution Scene-Based Video Watermarking Using Perceptual Models," *IEEE Journal on Selected Areas in Communications*, vol. 16, No. 4, May 1998, pp. 540-550.

Szepanski, "A Signal Theoretic Method For Creating Forgery-Proof Documents For Automatic Verification", 1979 Carnahan Conference on Crime Countermeasures, University of Kentucky, Lexington, Kentucky, May 16-18, 1979.

Szepanski, "Compatibility Problems in Add-On Data Transmission for TV-Channels," 2d Symp. and Tech. Exh. On Electromagnetic Compatibility, Jun. 28, 1977, pp. 263-268.

Szepanski, "Binary Data Transmission Over Video Channels with Very Low Amplitude Data Signals," Fernseh- und Kino-Technik, vol. 32, No. 7, Jul. 1978, pp. 251-256 (German text with full English translation).

Szepanski, Additive Binary Data Transmission for Video Signals, Conference of the Communications Engineering Society, 1980, NTG Technical Reports, vol. 74, pp. 343-351 (German text with full English translation).

Tanaka, "Embedding the Attribute Information Into a Dithered Image," *Systems and Computers in Japan*, vol. 21, No. 7, 1990, pp. 43-50.

Tanaka et al., Embedding Secret Information Into a Dithered Multi-Level Image, 1990 IEEE, pp. 216-220.

van den Branden Lambrecht et al., "Perceptual quality measure using a spatio-temporal model of the human visual system," *Proceedings of the SPIE Digital Video Compression: alogrithms and Technologies 1996*, vol. 2668, San Jose, California, Jan. 28-Feb. 2, 1996, pp. 450-461.

van Schyndel et al., "A Digital Watermark," IEEE International Conference on Image Processing, Nov. 13, 1994 pp. 86-90.

Weighted PSNR for images as in Certimark: S. Voloshynovskiy, S. Pereira. V. Iquise and T. Pun, "Attack modeling: Towards a second generation benchmark," *Signal Processing, Special Issue: Information Theoretic Issues in Digital Watermarking*, May 2001. V. Cappellini, M. Barni, F. Bartolini, Eds.

Wang et al., "A universal image quality index," *IEEE Signal Processing Letters*, vol. 9, No. 3, Mar. 2002.

Watson et al., "Digital video quality metric based on human vision," *Journal of Electronic Imaging*, vol. 10, No. 1, pp. 20-29, 2001.

Webster et al., "An objective video quality assessment system based on human perception," *Proceedings of the Human Vision, Visual Processing, and Digital Displays IV*, Feb. 1993, San Jose, CA, pp. 15-26.

Westen et al., "Spatio-temporal model of human vision for digital video compression," *Proceedings of the SPIE Human Vision and Electronic Imaging II*, Rogowitz, Pappas, Editors, vol. 3016, San Jose, CA, 1997, pp. 260-268.

U.S. Appl. No. 60/308,718, Lubin et al., filed Jul. 30, 2001.

U.S. Appl. No. 11/265,766, Levy, filed Nov. 1, 2005.

Office Action dated Mar. 17, 2008 and Amendment dated Jul. 17, 2008 from U.S. Appl. No. 10/300,921.

Notice of Allowance dated Nov. 18, 2008, from Application No. 10/300,921.

\* cited by examiner $$A_i = \left(\frac{N_1}{N}\right)A_A + \left(\frac{N_2}{N}\right)A_B + \left(\frac{N_3}{N}\right)A_C + \left(\frac{N_4}{N}\right)A_D$$

$A_i$ = Estimated Activity of block i in current VOP $N_1$ = # of Pixels in Area 1

$N_2$ = # of Pixels in Area 2

$N_3$ = # of Pixels in Area 3

$N_4$ = # of Pixels in Area 4

$N = N_1 + N_2 + N_3 + N_4 = 64$ $A_A$ = Estimated Activity of block A in reference VOP $A_B$ = Estimated Activity of block B in reference VOP $A_C$ = Estimated Activity of block C in reference VOP $A_D$ = Estimated Activity of block D in reference VOP

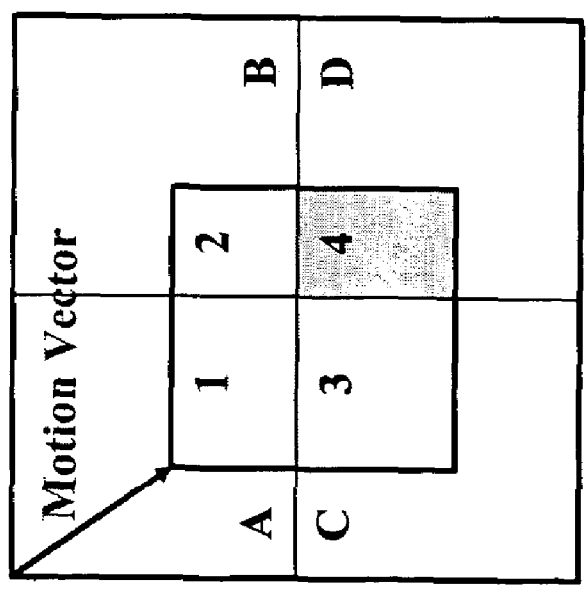

Fig. 6

DIGITAL WATERMARKING OF LOW BIT RATE VIDEO

RELATED APPLICATION DATA

This application claims the benefit of U.S. Provisional Applications: 60/434,823, filed Dec. 18, 2002, 60/428,485, filed Nov. 21, 2002, and 60/404,038, filed Aug. 15, 2002, which are hereby incorporated by reference.

This patent application is also a continuation in part of application Ser. No. 10/350,276, filed Jan. 22, 2003, which claims priority to Application 60/351,565, filed Jan. 22, 2002, which are hereby incorporated by reference.

TECHNICAL FIELD

The invention relates to digital watermarking, and particularly to digital watermarking of image and video signals.

BACKGROUND

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 6,122,403, which are hereby incorporated by reference.

SUMMARY

This disclosure describes various methods and systems for digital watermark embedding and reading in compressed data streams, and particularly, in compressed video streams. Current embodiments of these methods and systems are implemented in software instructions, and in particular, the C and/or C++ programming language. These methods may also be implemented in digital hardware circuitry, firmware, or a combination of hardware, software and firmware.

One aspect of the invention is a method for adaptive gain for watermarking compressed video. One approach calculates an adaptive gain for the watermark signal based on spatial information within a frame. This method computes the capacity of the video data for hiding the watermark signal as a function of energy or variance of the block, where the energy or variance is computed from the DCT coefficients in the compressed bit stream. Several alternative methods for computing the adaptive gain are disclosed. To compute adaptive gain based on temporal information, the embedder estimates the energy of blocks in a predicted frame based on corresponding blocks in the associated I frame. The motion vectors indicate the corresponding blocks in the associated I frame. The embedder computes an estimate energy for the predicted frame block by estimating the energy from the energy of one or more corresponding blocks in the I frame as indicated by the motion vector information.

Another aspect of the invention is another adaptive gain method for scaling the watermark energy before adding the watermark signal to the extracted coefficients from the compressed bit stream. In this method, the watermark embedder scales the watermark signal at each coefficient with a scaling factor dependent on the quantization index for that coefficient. As the magnitude of the quantization index increases, the magnitude of the scale factor also increases. This method may be used in combination with perceptual adaption based on an activity measure and/or prediction information as described in this document.

Another aspect of the invention is a method for embedding a digital watermark in a compressed data stream having objects that have been separately compressed using prediction. In embedding the watermark in a predicted object, the embedder compensates for the watermark added to a corresponding non-predicted object.

Another aspect of the invention is a method for watermarking video sprites in a compressed video stream. To avoid accumulation of error due to the watermark signal, the watermark signal for the previous frame is subtracted before adding the watermark signal for the current frame. Also, the watermark signal is pre-warped according to the affine transformation parameters for the frame so that the watermark signal is properly aligned in the video frame after the sprite is warped into that frame based on the affine transform parameters. The watermark signal is added to the sprite as an update mode using this approach for compensating for the previous watermark signal and the warping parameters.

Another aspect of the invention is a method for watermarking spatially and temporally scalable video bit streams. This method is implemented differently for spatial and temporal scalability. For temporal scalability, the digital watermark is added to the base and enhancement layers such that the watermark is detectable at all temporal resolutions. For spatial scalability, the watermark is added to the base and enhancement layers, but the watermark embedder compensates for the prediction used in the enhancement layer before adding the watermark in the enhancement layer. This enables the watermark to be detectable at all spatial resolutions.

Another aspect of the invention is a method of bit rate control for a watermark embedder of compressed video. Bit rate control is used to prevent the bit rate from increasing due to the embedding of the digital watermark. There are two alternative methods. In one method, the embedder sets the lowest frequency coefficients to zero in a block of video so that the bit rate is the same or lower after watermarking as the original bitstream for the block. Another method sets the highest frequency coefficients to zero so that the bit rate is maintained.

Further features will become apparent with reference to the following detailed description.

BRIEF DESCRIPTION OF THE DRAWINGS

FIG. 6 is a block diagram illustrating one particular adaptive gain calculation using motion information in a compressed video stream.

DETAILED DESCRIPTION

Digital Watermarking of Compressed Video

Figure 1:
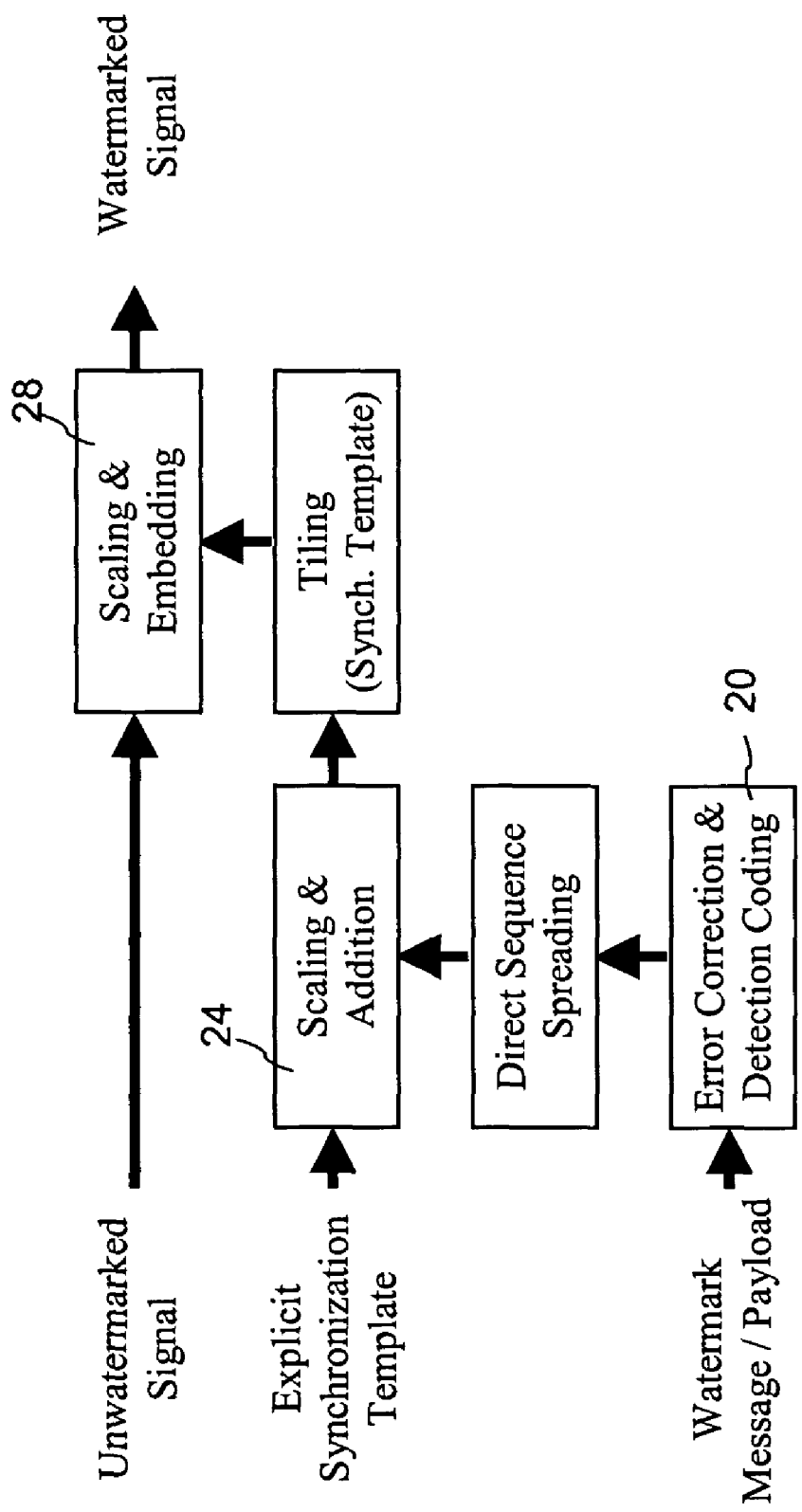
FIG. 1 is a block diagram illustrating an example of a digital watermark embedder.

Despite being an economic opportunity, video streaming is also a major concern for content owners. The Internet and other digital networks are means for freely and widely distributing high fidelity duplicates of digital media, which is a boon for authorized content distribution but also an avenue for major economic loss arising from illicit distribution and piracy. An effective digital-rights-management (DRM) system would allow content providers to track, monitor, and enforce usage rights of their contents in both digital and analog form. It can also link the content to the providers and may promote sales.

Digital watermarking and encryption are two oft-mentioned techniques proposed for use in digital-rights-management systems. Although encryption plays an important role in DRM and video streaming, it can only protect the digital content during transmission from the content provider to the authorized user. Once the content has been decrypted, encryption no longer provides any protection. A watermark, however, persists within the decrypted video stream and can be used to control access to the video. A DRM-compliant device can read the embedded watermark and control or prevent video playback according to the information contained in the watermark. A watermark may even persist in the video when it has been converted from digital to analog form. Video watermarking can be used in other applications than digital rights management. An embedded watermark can be used to authenticate the video stream, providing a means of verifying the integrity of the video and detecting forgeries or alterations. Video watermarking may also be used for tracking or tracing video content and broadcast monitoring, as well as for linking the video to its owner and facilitating value-added services that benefit both the owner and the consumers. However, before the lofty demands of current and potential future applications can be fulfilled, many challenges need to be overcome in video watermarking.

Digital video presents many challenging issues for watermarking. Foremost, Many digital video applications employ lossy compression techniques such as MPEG-1, MPEG-2 and MPEG-4 because the data rates for uncompressed digital video are often cumbersome and exceed storage or bandwidth limitations. To achieve an efficient representation of the video, compression techniques utilize a variety of predictive and quantization methods to remove spatial and temporal redundancy from the video. Unfortunately from a robust watermarking perspective, lossy compression and transcoding are considered forms of attack because they may remove components of a watermark signal and may severely damage an embedded watermark.

The computational cost of watermark embedding and detection is another issue in video watermarking, particularly for real-time applications such as watermarking live video streams as they are transmitted. For instance, motion estimation requires computationally expensive searches and may not be feasible in some watermarking applications. Motion estimation is one of the reasons why encoding (compressing) a video stream using a motion compensation-based video compression technique like MPEG-4 is computationally expensive. An example application in which computational cost of the watermarking system is a significant consideration is a video on demand system, where each video stream is watermarked with a client's unique identification number and license information prior to distribution over a network. The content provider has a compressed, unwatermarked video stream but wishes to distribute only compressed watermarked streams. Each client has access to a compliant player that reads the embedded watermark and plays the video according to the embedded licensing information in real-time. In this application, the content provider must be able to insert the watermark into a compressed video stream in real-time. The clients must be able to detect watermarks and respond to the encoded licensing information in real-time. Computational complexity of the system is further limited when a single server has to serve to multiple clients at the same time.

One approach to watermarking a compressed video stream is to decompress the video, use a spatial-domain or transform-domain watermarking technique on the uncompressed video, and then recompress the watermarked video. The embedded watermark is inserted with sufficient power to survive video compression process and possess the degree of robustness needed by the application. There are three major disadvantages to using the classical approach: First, the watermark embedder has no knowledge of how the video will be recompressed and cannot make informed decisions based on the compression parameters. This approach treats the video compression process as a removal attack and requires the watermark to be inserted with excess strength, which can impact watermark perceptibility. Second, from a computation point of view, decompression followed by watermark insertion and re-compression is very expensive and perhaps not the most efficient means for watermarking. Finally, a second compression step is likely to degrade the video quality, even when no or a very small distortion is introduced by the watermark.

A faster and more flexible approach to watermarking compressed video is that of compressed-domain watermarking. In compressed-domain watermarking, the original compressed video is partially decoded to expose the syntactic elements of the compressed bit-stream for watermarking (such as encoded DCT coefficients.) Then, the partially decoded bit-stream is modified to insert the watermark and lastly, reassembled to form the compressed, watermarked video. The watermark insertion process ensures that all modifications to the compressed bit-stream will produce a syntactically valid bit-stream that can be decoded by a standard decoder. In contrast with the classical approach, the watermark embedder has access to information contained in the compressed bit-stream, such as group-of-pictures (GOP) structure, prediction, and quantization information, and can adjust the watermark embedding according to the compression parameters to improve robustness, capacity, and visual quality. This approach also allows a watermark to be embedded without resorting to the computationally expensive process of decompression, watermarking, and recompression. In particular with respect to the compressed-domain watermarking of MPEG-4 bit-streams, motion estimation is not performed when the watermarked bit-stream is reassembled.

Since compressed-domain watermarking involves processing compressed bit-streams, there are issues involved in compressed-domain watermarking that do not apply in the classical approach. Compressed-domain watermarking tightly couples the watermark embedder with the video compression method in the partial decoding and reassembly steps. Because watermarked bit-streams must be decodable by a standard decoder, compressed-domain watermark insertion is constrained by the bit-stream syntax and coding limitations of the video compression method. The second issue is that of drift when the video is modified during watermark insertion. Drift occurs when (spatial or temporal) prediction is used and a predictor is modified without adjusting the residual to compensate for the modified predictor. This leads to a discrepancy, known as drift, between the reconstructed videos using the original and modified predictors. Drift can spread or accumulate if the incorrectly predicted values are used as predictors themselves. A compressed-domain watermarking technique must compensate for drift during watermark insertion to prevent drift from spreading and accumulating, leading to visible artifacts in the decoded video. Lastly, the bit rate of the watermarked video must be controlled to within the limits specified by an application. Ideally, the rate overhead of watermarking is minimized so that the overall bit rate of the video is not substantially increased when the compressed video is watermarked.

In most blind watermarking techniques (i.e. detection without the original, unmarked signal), the detector must synchronize with the spatial and temporal coordinates of the watermark signal before reliable detection can occur. Detector synchronization is a very important problem in video even in the absence of a malicious attacker. For example in a broadcast application, for which the video may not have a well-defined "beginning" and "end", the watermark detector must be able to synchronize to an arbitrary position within the video prior to detecting any watermarks. In a video streaming application, it is possible for network congestion to cause the video signal to be lost for an indeterminate amount of time. Obviously, a malicious attacker can also attempt a variety of spatial and temporal synchronization attacks against a watermarked video, such as rescaling, cropping, and re-sampling (frame averaging or frame-rate conversion). The most fundamental method for establishing synchronization between the detector and the watermark is a search over the space of all possible transformations (translations, rotations, scales, warping) in both the spatial and temporal dimensions until synchronization is found or the detector decides there is no watermark present. This is sometimes performed by a so-called sliding correlator and is not practical for video because the search space of transformations is much too large even for non-real-time video applications. A practical means for establishing and maintaining synchronization in video is the embedding of a synchronization signal, such as a template, which can be examined by the watermark detector to determine the orientation and scale of the watermark. Templates can be embedded in domains that facilitate efficient search. Efficient synchronization can also be achieved by appropriate design of a watermark.

MPEG-4 is an object-based standard for coding multimedia at low bit-rates. Video compression field-tests at rates below 1 Mbit/s have consistently indicated better performance for MPEG-4 than for MPEG-1 and 2. Increased compression efficiency and flexibility of the standard prompted Internet Streaming Media Alliance (ISMA) to promote Advanced Simple Profile (ASP) of MPEG-4 for broadband Internet multimedia streaming. Using MPEG-4 for delivering video on the Internet is gaining momentum and is expected to be ubiquitous.

We present a compressed-domain watermarking technique for MPEG-4 video streams. Our drift compensation method supports the prediction modes in MPEG-4, including spatial (intra-DC and AC) prediction. Watermark detection is performed in the spatial domain, with the use of templates to establish and maintain detector synchronization. Since the relationship between the DCT domain and spatial domain is linear, an equivalent detector can be built to extract the watermark from the DCT coefficients.

Also, we introduce new methods for adapting the gain of the watermark based on the characteristics of the original video and for controlling the data rate of the watermarked video. Experimental results indicate that our technique is robust against a variety of attacks, including filtering, scaling, rotation, and transcoding.

An overview of MPEG-4 is in Section 1, our watermarking technique is described in Section 2, followed by results in Section 3.

1. OverView of MPEG4

MPEG-4 is an object-based standard for coding multimedia at low bit-rates. It became an international standard in December 1999. It allows for the coding of visual, audio and system information. It encodes the visual information as objects, which include natural video, synthetic video (mesh and face coding of wire frame), and still texture. It delivers, in addition, a coded description of the scene. At the decoding end, the scene description and the individual media objects are decoded, synchronized, and composed for presentation.

This discussion relates to the watermarking of the natural video objects. A natural Video Object (VO) in MPEG-4 may correspond to the entire scene or a physical object in the scene. A VOP is expected to have a semantic meaning such as car, tree, man, and etc. A Video Object Plane (VOP) is a temporal instance of a VOP, and a displayed frame is the overlap of the same instance VOPs of all video objects in the sequence. A frame is only composed during the display process using information provided by the encoder or the user. This information indicates where and when VOPs of a VO to be displayed. Video objects may have arbitrary shapes. The shape information is encoded using context switched arithmetic encoder that is provided along with the texture information.

The texture information is encoded using a hybrid motion-compensated DCT compression algorithm similar to that used in MPEG-1 and 2. This algorithm uses motion compensation to reduce inter-frame redundancy and the DCT to compact the energy in every 8×8 block of the image into a few coefficients. It, then, adaptively quantizes the DCT coefficients in order to achieve the desired low bit-rate. It also uses Huffman codes to encode the quantized DCT coefficients, the motion vectors, and most other necessary control parameters, in order to reduce the statistical redundancies in the data before transmission. All coded information are finally assembled into an elementary bit-stream that represents a single video object. MPEG-4 has enhanced coding efficiency that can be partially attributed to sophisticated DC coefficient, AC coefficient, and motion vector prediction algorithms, as well as, the use of Overlapped Block Motion Compensation (OBMC).

In order to enable the use of MPEG-4 with many applications, MPEG-4 includes variety of encoding tools. MPEG-4 allows the encoding of interlaced as well as progressive video. It also allows temporal and spatial scalability. Moreover, it allows sprite encoding. However, not all of these tools are needed for a particular application. Hence, to simplify the design of the decoders, MPEG-4 defines a set of profiles and a set of levels within each profile. Each profile was designed with one class of applications in mind. Simple, advanced simple, core, main, and simple scalable are some of the profiles for natural video. Due to its simplicity and improved video quality and compression efficiency, the advanced simple profile is being promoted by the Internet Streaming Media Alliance (ISMA) for delivering video over the broadband Internet.

2. Proposed Method

In the proposed method, a watermark signal is inserted directly into the MPEG-4 compressed bit-stream while detection is performed using the uncompressed video or partially compressed video (e.g., the DCT coefficients). This allows watermark detection even if video has been manipulated or its format changed, without writing a detector to interpret new formats.

The elementary watermark signal is designed in the uncompressed pixel domain and consecutively inserted directly into the MPEG-4 bit-stream. Using a spatial domain elementary watermark signal simplifies the correspondence between the compressed domain embedding and pixel domain detection processes. In a similar manner, the watermark signal may be designed in the DCT or other transform domain to simplify detection in that domain. The domain of watermark embedding may be adapted for a particular application and embedding algorithm, and the approach provided in this document is just one example. While designed in one domain, the equivalent watermark signal may be embedding in a different domain by transforming the watermark into the desired domain. In our case, the variable message component of the watermark is designed in the spatial domain and converted to the DCT domain for embedding.

In our example embedder, the elementary watermark signal comprises a spread spectrum message signal and a synchronization template.

Section 2.A outlines the design of the spread spectrum message signal for coping with host signal interference and subsequent processing noise, and two synchronization templates for coping with possible geometrical manipulations and Section 2.B addresses the process in which the elementary watermark signal is inserted into the MPEG-4 bit-stream.

2.A Elementary Spread-Spectrum Watermark

Our elementary watermark is a spread-spectrum signal in spatial domain and covers the entire video object. In direct-sequence spread spectrum communications, the message signal is modulated with a pseudo-noise pattern and detection is performed using a correlation detector. Spread-spectrum communication techniques provide reliable data transmission even in very low signal-to-noise ratio (SNR) conditions. The watermark signal is often impaired due to the interference from the host signal and additional noise arising from subsequent processing. In addition, watermark signal to noise (host signal plus additional noise) ratio is limited to a small value to ensure the imperceptibility of the watermark signal. As a result, spread-spectrum techniques are frequently used in watermarking applications and their use is extensively studied in the literature.

As noted, other forms of digital watermarks and embedding operations may be used in the alternative. Techniques for spreading the message signal onto a carrier (either random or not), and for scattering the message among embedding locations in the host signal (either randomly or according to some pattern) may vary, and are not required in all cases. Moreover, the techniques used to combine different components of the watermark to other components (e.g., message and template components), and techniques used to combine the watermark with the host signal need not be strictly linear or additive. A variety of informed embedding and coding techniques may be used to exploit knowledge of the host signal and its relationship with the watermark signal to improve message capacity, robustness to distortion, and/or imperceptibility of the embedded data. One such approach is to adjust the host signal at an embedding location corresponding to an element of the watermark signal as necessary to carry the desired auxiliary information with desired robustness and imperceptibility. This adjustment may be zero or slight if the host signal already has characteristics that correspond to the data to be embedded with the desired robustness and imperceptibly. Conversely, the adjustment may be larger if the host signal is inconsistent with the desired data to be embedded. Since the original host signal and watermark signal are known, adjustments made to embed the watermark within the host may be represented as an additive "difference" signal, even if the particular adjustment calculation is non-linear.

Despite their robustness against additive noise, spread spectrum and other forms of watermarks are vulnerable to synchronization error, which occurs when the watermarked signal undergoes geometric manipulations such as scaling, cropping and rotation. Before proceeding to the encoding of the message payload, we address the issue of synchronization and outline template based mechanisms that combat loss of synchronization.

2.A.1 Synchronization Templates

A template is any pattern or structure in the embedded watermark that can be exploited to recover synchronization at the decoder and is not limited to the addition of auxiliary signals as often referred in the literature. Here, a pair of templates is imposed on the spread spectrum signal to combat synchronization loss. In particular, the synchronization templates are used to determine the change in rotation and scale after watermark embedding. Once known, these modifications are reversed prior to detection of the message using spread spectrum techniques.

The first template is implicit in the signal design and restricts the watermark signal to have a regular (periodic) structure. In particular, the watermark $w(x,y)$ is constructed by repeating an elementary watermark tile $\hat{w}(x,y)$ (of size $N \times M$) in a non-overlapping fashion. This tiled structure of the watermark can be detected by autocorrelation. If the watermark tile is appropriately designed, a peak occurs at the center of each tile. When a pseudo-random noise pattern is used as the watermark tile, it should be derived from a random process with a white power spectrum. In this case, an impulse is observed in the autocorrelation domain. Nevertheless, in practical applications, this design criterion can be relaxed and colored noise patterns can be used, albeit at the expense of a sharper peak.

If a linear transformation A is applied to a watermarked VOP, the autocorrelation coefficients $h(x,y)$, thus the peaks, move to new locations $(x',y')$ according to $$[x'y']^T = A[xy]^T \qquad (1)$$

The second synchronization template forces $w(x,y)$ to contain a constellation of peaks in the frequency domain. This requirement can be met by constructing $\hat{w}(x,y)$ as a combination of an explicit synchronization signal, g(x,y), and a message-bearing signal m(x,y). In the frequency domain, g(x,y) is composed of peaks in the mid-frequency band, each peak occupying one frequency coefficient and having unity magnitude and pseudo random phase. The random phase makes the signal look somewhat random in the spatial domain. Since the magnitude of the FFT is shift invariant and a linear transformation applied to the image has a well-understood effect on the frequency representation of the image, these peaks can be detected in the frequency domain and used to combat geometrical distortions. Specifically, a linear transformation A applied to the image f will cause its FFT coefficient F(u,v) to move to a new location (u',v'), such that $$[u'v']^T = (A^T)^{-1}[uv]^T \qquad (2)$$

Note that the magnitude of F(u,v) will be scaled by $|A|^{-1/2}$.

If A represents a uniform scaling by factor S and a counter clockwise rotation by angle θ, then $$A = \begin{bmatrix} S\cos\theta & -S\sin\theta \\ S\sin\theta & S\cos\theta \end{bmatrix} \qquad (3)$$

The unknown scaling and rotation parameters can be obtained using either or both of the synchronization templates. A log-polar transform of the coordinates is used to convert the scale and rotation into linear shifts in the horizontal and vertical directions. For synchronization using the first template (autocorrelation) the origin of the log-polar mapping is chosen as the largest peak (image center). Under the log-polar mapping, the transformation A becomes:

$$\begin{bmatrix} \log\rho' \\ \alpha' \end{bmatrix} = \begin{bmatrix} \log\rho \\ \alpha \end{bmatrix} + \begin{bmatrix} \log S \\ \theta \end{bmatrix} \qquad (4)$$

For the second template (Fourier coefficients) the mapping will have the same form as (4) with a different scale term. (1/S or negative shift in scale direction) Given that the watermark templates are known, the linear shifts in log-polar domain can be detected using a Phase Only Match filter (POM).

2.A.2 Message Signal Formation

The message-bearing signal is constructed using the tiling pattern enforced by the synchronization template. In particular, a message signal tile, m(x,y), of size N×M is formed to carry the required payload. A 31-bit payload was used for watermarking each MPEG-4 video object. Error correction and detection bits are added to the message to protect it from channel errors caused by the host image or distortion noise added by normal processing or an intentional attacker.

In order to reduce visibility and the effect of the host image on the watermark, spread spectrum modulation is used with the message bits. First, the values 0, 1 are mapped to −1 and 1, respectively. Then, each bit is multiplied by a different pseudo random code of length K producing a spread vector of size K. Finally, an N×M tile is constructed using all the resulting spread vectors by scattering them over the tile, such that each location of the tile is occupied by a unique bit. This permutation of the watermark signal has a similar effect to whitening the image signal before adding the watermark, which improves the performance of the correlator used by the watermark detector. This tile comprises the message signal m(x,y).

The watermark tile signal, ŵ(x,y), was composed by adding the message signal, m(x,y), to the spatial representation of the synchronization signal, g(x,y) as $$\hat{w}(x,y) = am(x,y) + bg(x,y) \qquad (5)$$

where a and b are predetermined constants that control relative power between the message and the synchronization signals. These coefficients are adjusted according to the expected distortions in the operating environment and underlying host signal characteristics. For instance, if robustness against additive noise is necessary while geometric manipulations are less probable, the power of the message signal is increased in the expense of synchronization signal power.

FIG. 1 illustrates a block diagram of a digital watermark embedder process, including steps for creating and embedding the watermark with two synchronization templates. The embedder inputs include the watermark message payload, un-watermarked signal, and, optionally, an explicit synchronization template. The embedder adds error detection to the payload message bits, such as a CRC, and then performs error correction coding (e.g., repetition, convolution, turbo, block, concatenated coding) as shown in block 20. It then spreads the message signal onto a carrier as shown in block 22. The embedder then takes the spread message signal and combines it with the explicit synchronization template using amplitude scaling to adjust the relative strengths of the message and synchronization signal components of the digital watermark (24). The synchronization and message signals may be combined through addition or otherwise such that they are spatially and temporally overlapped/and or interleaved in the video signal. The embedder then tiles the watermark signal in the host video, and this tiling forms a pattern that provides another synchronization template (26). Finally, the embedder inserts the digital watermark in the un-watermarked signal (28). The embedder uses perceptual modeling and/or informed embedding to adapt the watermark signal to the un-watermarked signal.

2.B Watermarking MPEG4 Compressed Domain

This section describes embedding the watermark directly to the bit-stream generated in accordance with the MPEG-4 standard. Here, we focus our attention on the Advanced Simple Profile (ASP) of MPEG-4. ASP supports all capabilities of MPEG-4 Simple Profile in addition to B-VOPs (Video Object Planes), quarter-pel motion compensation, extra quantization tables, and global motion compensation. The techniques and methodology employed in this section can be extended to other profiles of the standard, often with only minor modifications. These include support for arbitrary-shaped objects, scalability, interlaced video, and sprites. Later, we describe methods for watermarking scalable video, interlaced video and sprites.

2.B.1 Watermark Embedding

Figure 2:
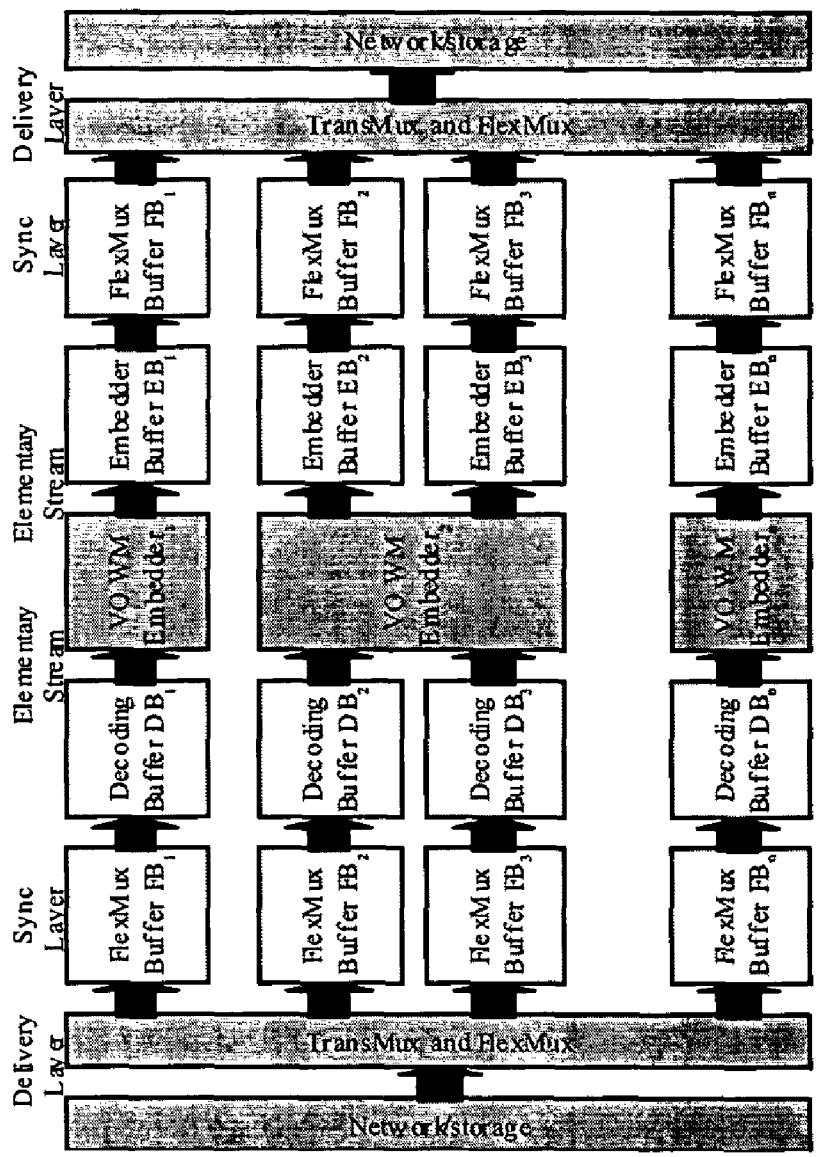
FIG. 2. is a block diagram illustrating how digital watermark embedding is performed on elementary bit streams of a compressed data stream.

The watermark embedder is depicted in FIG. 2. It mimics the system decoder model described by MPEG-4 standard. The Delivery layer extracts access units (SL packet) and their associated framing information from the network or storage device and passes them to the Sync Layer. The Sync layer extracts the payloads from the SL packets and uses the stream map information to identify and assemble the associated elementary bit-streams. Finally, the elementary bit-streams are parsed and watermarked according to the scene description information. The Sync layer re-packetizes the elementary bit-streams into access units and delivers them to the Delivery layer, where framing information is added, and the resulting data is transported to the network or the storage device.

Figure 3:
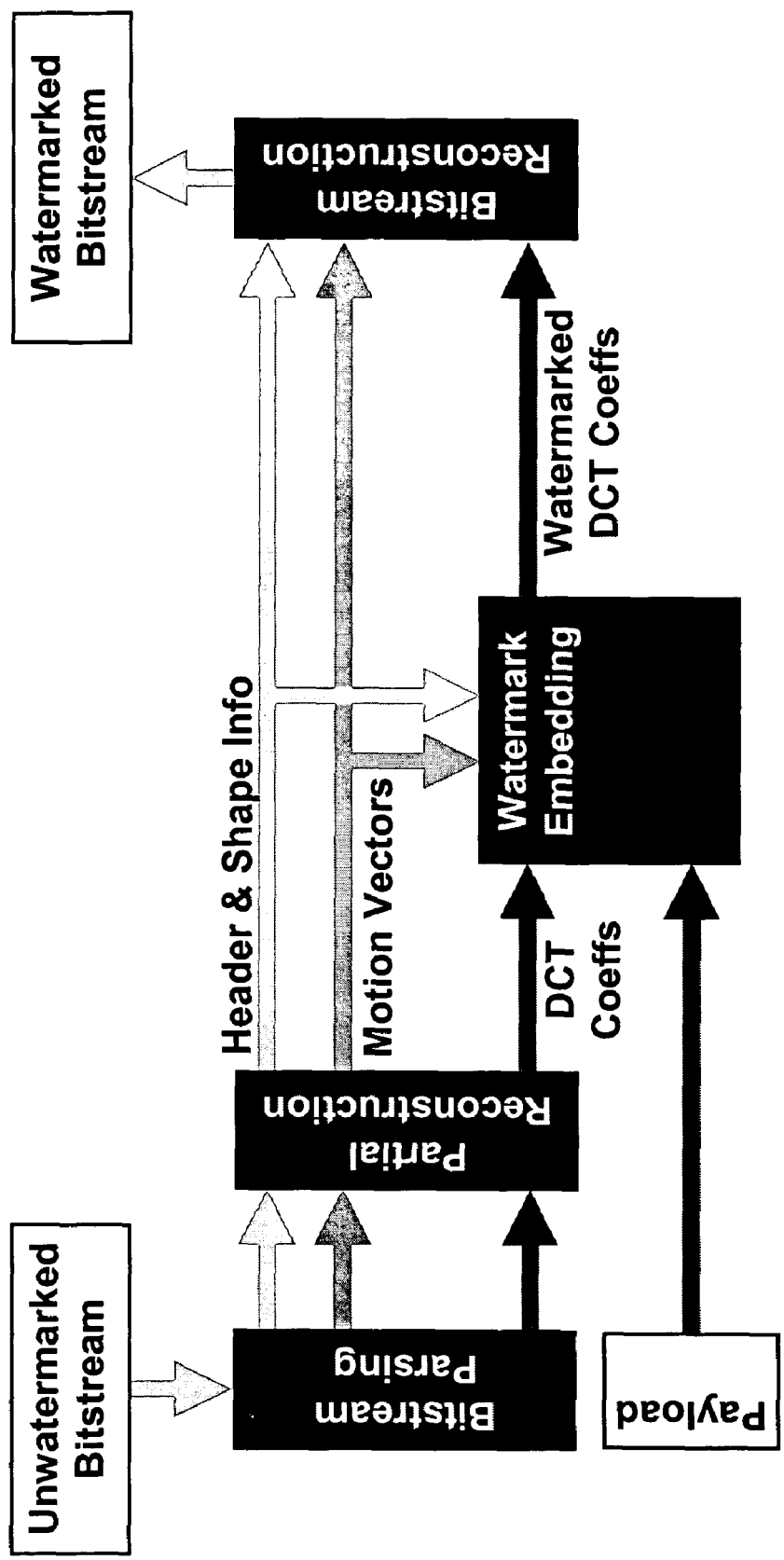
FIG. 3 is another block diagram illustrating digital watermark embedding of a compressed video stream.

In order to add the watermark w(x,y) to the luminance plane of the VOPs (Video Object Planes), an elementary bit-stream has to be modified. However, only partial decompression of the bit-stream is sufficient for the required modifications and full decompression is not necessary. Since the DCT is a linear transform, adding the transformed watermark signal directly to the DCT coefficients of the luminance blocks is equivalent to addition in spatial domain. Hence, the elementary bit-stream must be parsed partially and only the DCT coefficients must be modified. All other information is used to re-assemble the watermarked bit-stream and must be retained (as shown in FIG. 3).

An elementary bit-stream is parsed down to the block level and variable length coded motion vector and DCT coefficients are obtained. Motion vectors are reconstructed by VLC decoding and reversing any prediction steps when applicable. Likewise, VLC decoding, inverse zig-zag scanning, inverse prediction and de-quantization is employed to obtain reconstructed DCT coefficients. After the watermark signal is embedded into the DCT coefficients, VLC codes corresponding to these coefficients are regenerated and bit-stream is reconstructed.

Figure 4:
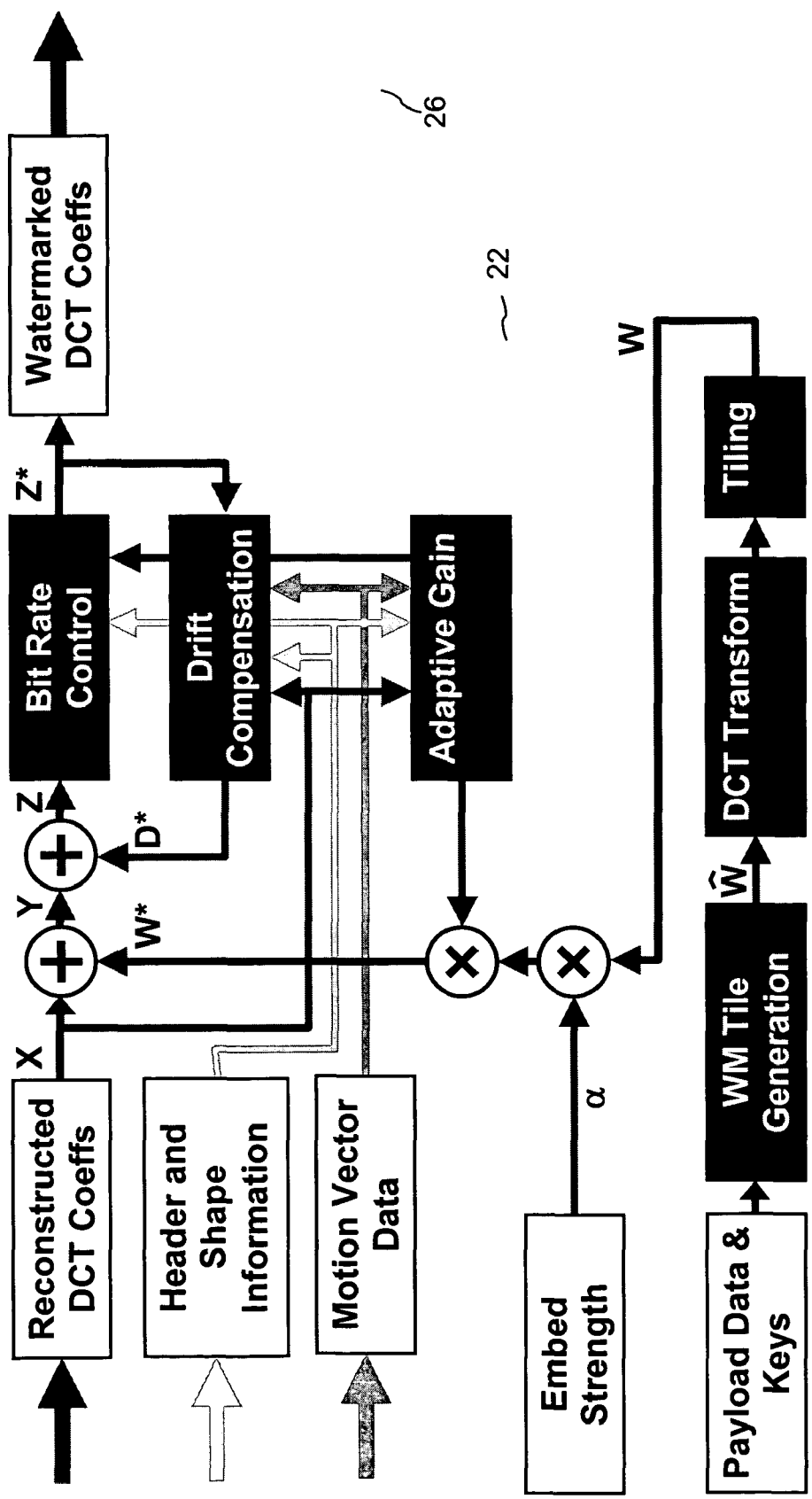
FIG. 4. is another block diagram illustrating digital watermark embedding of a compressed video stream, including drift compensation, bit rate control and adaptive gain.
Figure 8:
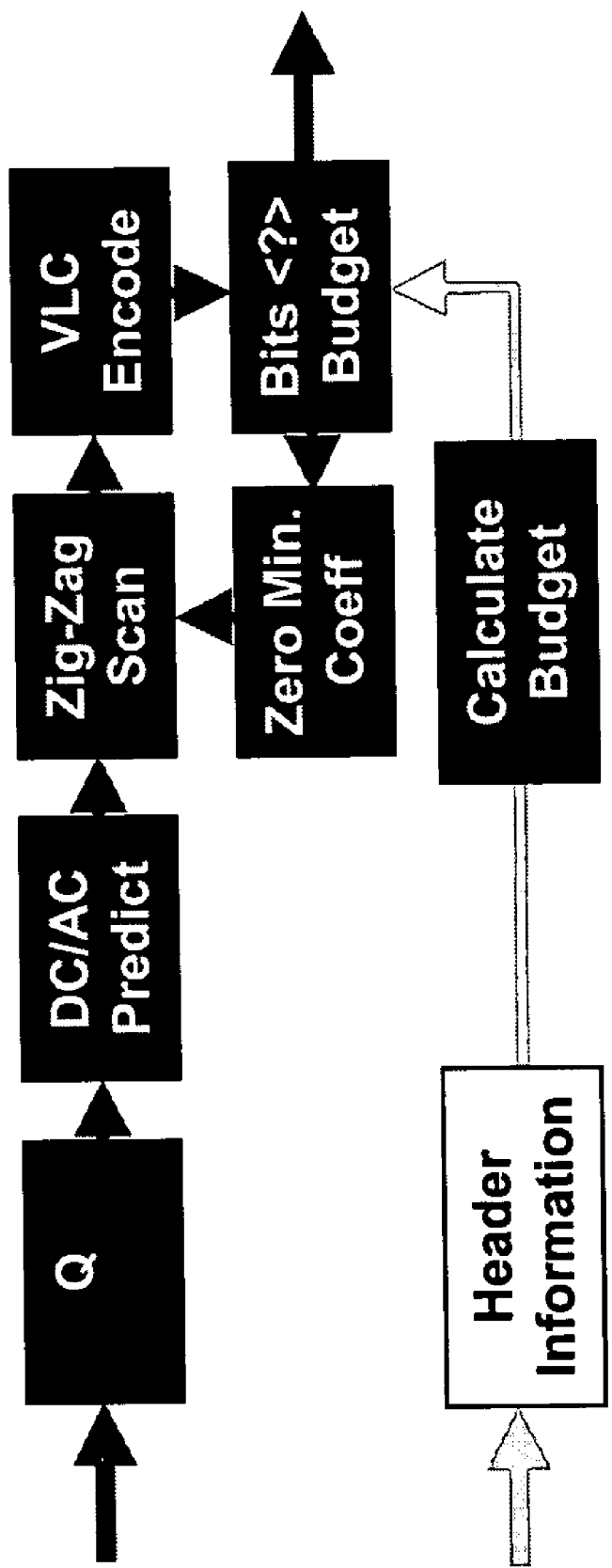
FIG. 8 is a block diagram illustrating a bit rate controller for digital watermarking of a compressed data stream.

Insertion of the watermark signal into the reconstructed DCT coefficients is illustrated in FIG. 4. Before adding the watermark w(x,y) to the VOPs, w(x,y) is divided into 8×8 non-overlapping blocks, transformed to the DCT domain, and the DC coefficient of each block is set to zero. The latter step is necessary in order to maintain the integrity of the bit-stream by preserving the original direction of the DC prediction. Removal of the DC terms often has an insignificant effect on the overall performance of the algorithm. The transformed watermark, W(u,v), is added to the DCT coefficients of the luminance blocks of a VOP as follows:

For every luminance blocks of a given VOP:
1. Decode the DCT coefficients by decoding the VLC codes, converting the run-value pairs using the given zig-zag scan order, reversing the AC prediction (if applicable), and inverse quantization using the given quantizer scale. This provides reconstructed DCT Coefficients shown in FIG. 4.
2. Obtain the part of the W(u,v) corresponding to the location of the current block mod N in the horizontal direction and mod M in the vertical direction.
3. Scale the watermark signal by a content-adaptive local gain and a user-specified global gain. See Adaptive Gain block in FIG. 4
4. If the block is inter-coded, compute a drift signal using the motion compensated reference error. See Drift Compensation block in FIG. 4
5. Add the scaled watermark and the drift signal to the original AC coefficients. All coefficients in non-skipped macroblocks are considered for watermark imbedding.
6. Re-encode the DCT coefficients into VLC codes by quantization, AC prediction (if applicable), zig-zag scanning, constructing run-value pairs and VLC coding
7. If necessary, selectively remove DCT coefficients and redo the VLC coding to match the target bit-rate. See Bit Rate Control block in FIG. 4
8. Adjust the Coded-Block Pattern (CBP) to properly match the coded and not coded blocks after watermarking.

Once all the blocks in a VOP are processed, the bit-stream corresponding to the VOP is re-assembled. Hereunder, we detail the gain adaptation, drift compensation and bit-rate control procedures.

2.B.1.a Adaptive Gain (Local Gain Control)

The objective of the adaptive gain (or local gain control) is to improve the performance of the watermark by adapting the watermark embedding to the local characteristics of the host video. For relatively smooth regions of the video, where even a small amount of distortion may be visible, the local gain control reduces the watermark embedding power to minimize watermark perceptibility. For relatively busy or textured regions of the image, the local gain control increases the embedding power for improved robustness. The gain control is constrained by computational limits to preserve the advantage of compressed-domain watermark embedding and may not be able to exploit features that require expensive analysis, such as multi-channel visual modeling or temporal masking.

Our local gain control method is applicable for both intra-coded VOPs as well as predicted VOPs in an MPEG-4 video. Our method uses a local activity measure to adjust the watermark embedding power on a block-by-block basis, which is obtained directly from the DCT coefficient values for intra-blocks and predicted using motion-vector information for predicted blocks. Our method does not require the video to be fully decoded and is computationally efficient.

Figure 5:
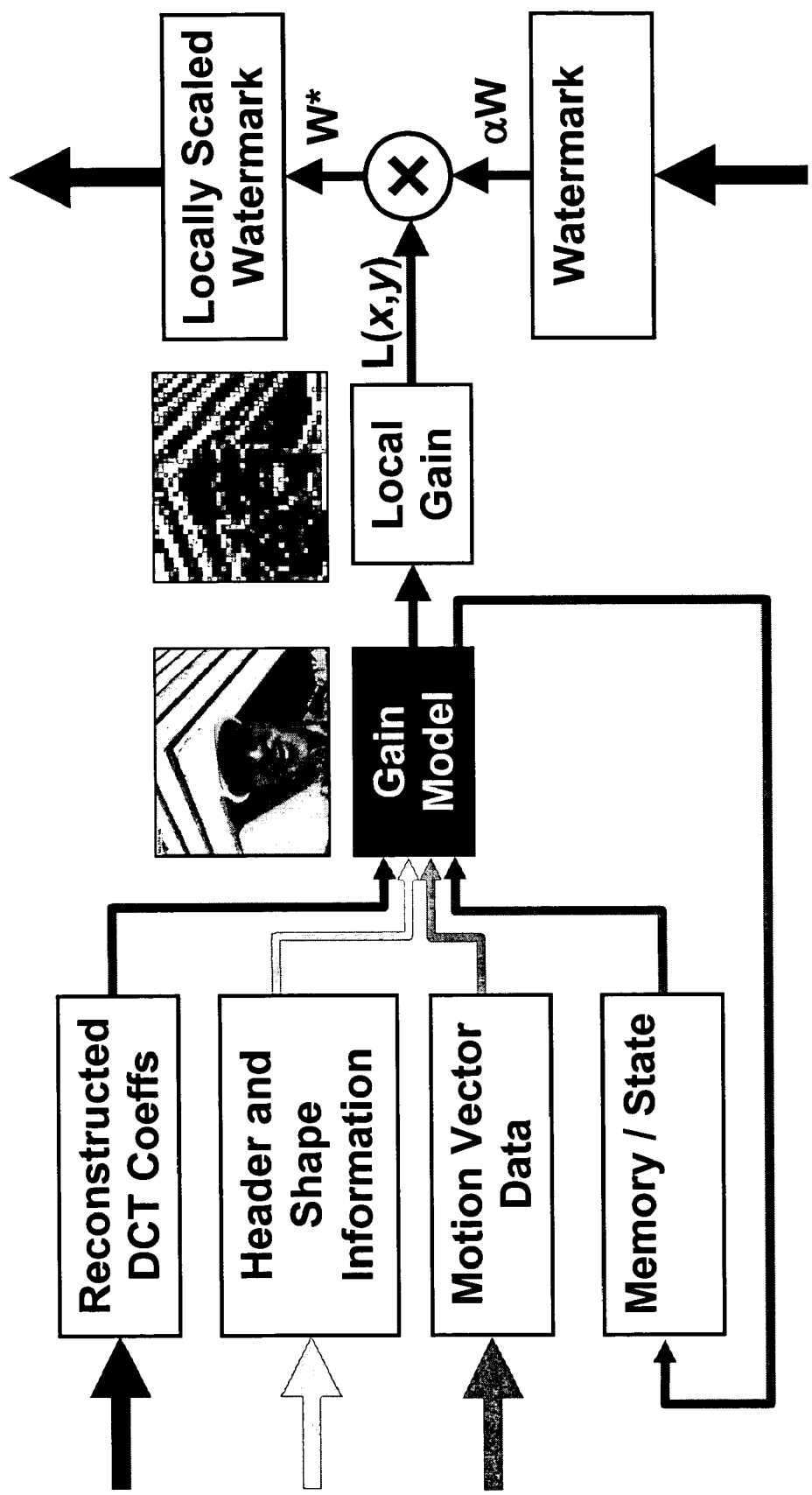
FIG. 5 is a block diagram illustrating adaptive gain for digital watermarking computed based on a compressed video stream.

FIG. 5 shows our local gain control model. Information about the video, such as the DCT coefficients and motion vector data, is provided to a gain model. The gain model outputs local gain weights L(x,y), where (x,y) refer to spatial coordinates in the video frame. The watermark coefficients are then weighted by L(x,y) to produce the watermark signal that will be embedded into the video:

$$W^*(x,y) = \alpha L(x,y) W(x,y) \tag{6}$$

where W* is the watermark that will be embedded, $\alpha$ is the user-selected global gain, and W is the watermark signal prior to gain adjustment. As a special case, disabling the adaptive gain is the equivalent of selecting L(x,y)=1.0 for all (x,y).

Our gain model assigns local gain weights on a block-by-block basis, with each block corresponding to a single block in MPEG-4 (8×8 pixels in size.) For each VOP, two steps are performed: Activity Estimation, which estimates the amount of spatial activity ("busy"-ness) for each block, followed by Weight Assignment, which determines the local gain weights based on the estimated activity in the VOP. Because the encoded video data is different for intra-coded VOPs and predicted VOPs (P-VOPs and B-VOPs) in MPEG-4, two different methods are used for estimating activity. For all blocks in I-VOPs and intra-coded blocks occurring in predicted VOPs, the energy of the DCT coefficients (which is related to the variance of the spatial pixel values) is used as an estimate of activity:

$$A_i = \sum_{k=start}^{end} [DCT_k]^2 \tag{7}$$

where $A_i$ is the activity measure of block i, i is the block index, and $DCT_k$ is the reconstructed value of the k-th DCT coefficient in zig-zag order ($DCT_0$ is the DC coefficient). As described, this calculation requires inverse intra-DC and intra-AC prediction to be performed on each block. However, with the exception of the 15 coefficients that may be affected by DC/AC prediction, calculating $A_i$ requires only the examination of the events encoded in the bit-stream (because all DCT coefficients quantized to the zero value are not explicitly coded as events.)

For non-intra blocks in predicted VOPs, equation (7) is not an appropriate activity estimator because the encoded DCT values in the bit-stream represent the prediction residual from motion compensation and not the base-band image itself. High DCT coefficient values in these blocks indicate temporal prediction is performing poorly and does not necessarily indicate high spatial activity or "busy"-ness. One method for activity estimation would be to fully decode and reconstruct all predicted VOPs and then use (7) on each block. We adopt another method which uses motion vector information to estimate the activity of predicted blocks in a manner similar to motion compensation.

Our method for activity estimation in predicted blocks require the local gain control to memorize the activity estimates of blocks in previously decoded VOPs, analogous to the picture buffers used by MPEG-4 decoders for motion compensation. Unlike the motion compensation, however, only a single value is retained for each block. The estimated activity of each predicted block is then an average of the estimated activity of blocks in the reference frame(s), weighted appropriately by motion vector information as shown in FIG. 6. Note that the activity measure shown in the figure, $$A_i = \left(\frac{N_1}{N}\right) A_A + \left(\frac{N_2}{N}\right) A_B + \left(\frac{N_3}{N}\right) A_C + \left(\frac{N_4}{N}\right) A_D \quad (8)$$

ignores the DCT values of the encoded residual for the predicted block to obtain $A_i$. The computation of (8) only requires the motion vector to be decoded for the predicted block and has little computational cost compared with motion compensation and VOP reconstruction.

Once the activity estimates ($A_i$'s) for all blocks in the current VOP have been obtained, the local gain weight for each block is $$L_i = \frac{\sqrt{A_i}}{\frac{1}{M}\sum_{k=1}^{M}\left(\sqrt{A_k}\right)} = \frac{\sqrt{A_i}}{\mathrm{mean}(\sqrt{A_k})} \quad (9)$$

where $L_i$ is the local gain weight for block i, $A_i$ is the activity estimate for block i, i and k are block indices, and M is the total number of blocks in the VOP. Equation (9) gives greater weight to blocks with higher activity estimates in the VOP, which causes the watermark be embedded more strongly in "busy" regions the VOP while at the time attenuating the watermark in relatively "smooth" regions of the VOP. The local gain weights may also be thresholded to within a desired range, preventing "outliers" from affecting the visual quality too greatly.

A related method for performing temporal masking is to measure the temporal activity of the video over time and compare it with the watermark in the corresponding location over time. A temporal gain is then computed as a function of the relationship between the temporal activity of the video and the temporal activity of the watermark. If the temporal activity (e.g., temporal frequency) of the watermark and video are similar such that the video masks the watermark, the watermark gain is increased.

Conversely, the temporal gain is selectively decreased where the temporal activity does not mask the watermark. The temporal gain is computed for locations in the video object (e.g., the blocks of coefficients) based on the coefficients in the reference I frame and the prediction information, including motion vectors, from which the temporal activity is derived. The gain selectively increases or decreases the watermark signal strength at those locations.

2.B.1.b Drift Signal Compensation

One of the challenges in compressed domain watermarking is coping with the accumulation of watermarking distortions, and thereof the visual quality degradation, due to motion compensation in inter-coded frames. In motion compensated compression algorithms, a luminance block is coded either in intra-mode, without reference to neighboring frames, or in inter-mode. In inter-mode, a block is predicted using previously coded frames and the prediction error, also called the residual, is encoded. When watermark signal is added to a frame, it "leaks" into successive frames that use it as a reference in prediction. If not properly compensated, a drift between the intended reference at the encoder and the reconstructed reference at the decoder is formed. Since watermark signal is added to each difference signal, the drift between the encoder and decoder may gradually increase with each inter-coded frame. The drift is stopped indirectly and its effects are minimized by selecting intra-coding more frequently. Intra-coded blocks do not refer to previous frames, and thereof to the accumulated drift error. Nevertheless, in general intra-coded frames require more bits and using more frequent intra coding may not be feasible. Moreover, at the watermarking stage, the coding decisions have already been made and cannot be altered without significant computational resources.

Drift in watermarking applications has two different but related effects: i) leaking watermark signal interferes with the watermark signal that is embedded in the consecutive frames; ii) accumulation of drift error may cause visual artifacts and may become intolerable. The inter-frame watermark signal interference may be constructive and improve watermark detection. This phenomenon is frequently observed when there is uniform or no motion between consecutive frames. Nevertheless, motion field is often non-uniform and the interference is deconstructive. That is, motion vectors within a frame are in different directions and they scramble the previous watermark signal, preventing constructive interference. Bearing similar characteristics to the real watermark, the scrambled signal often hinders detection and deteriorates the performance.

Figure 7:
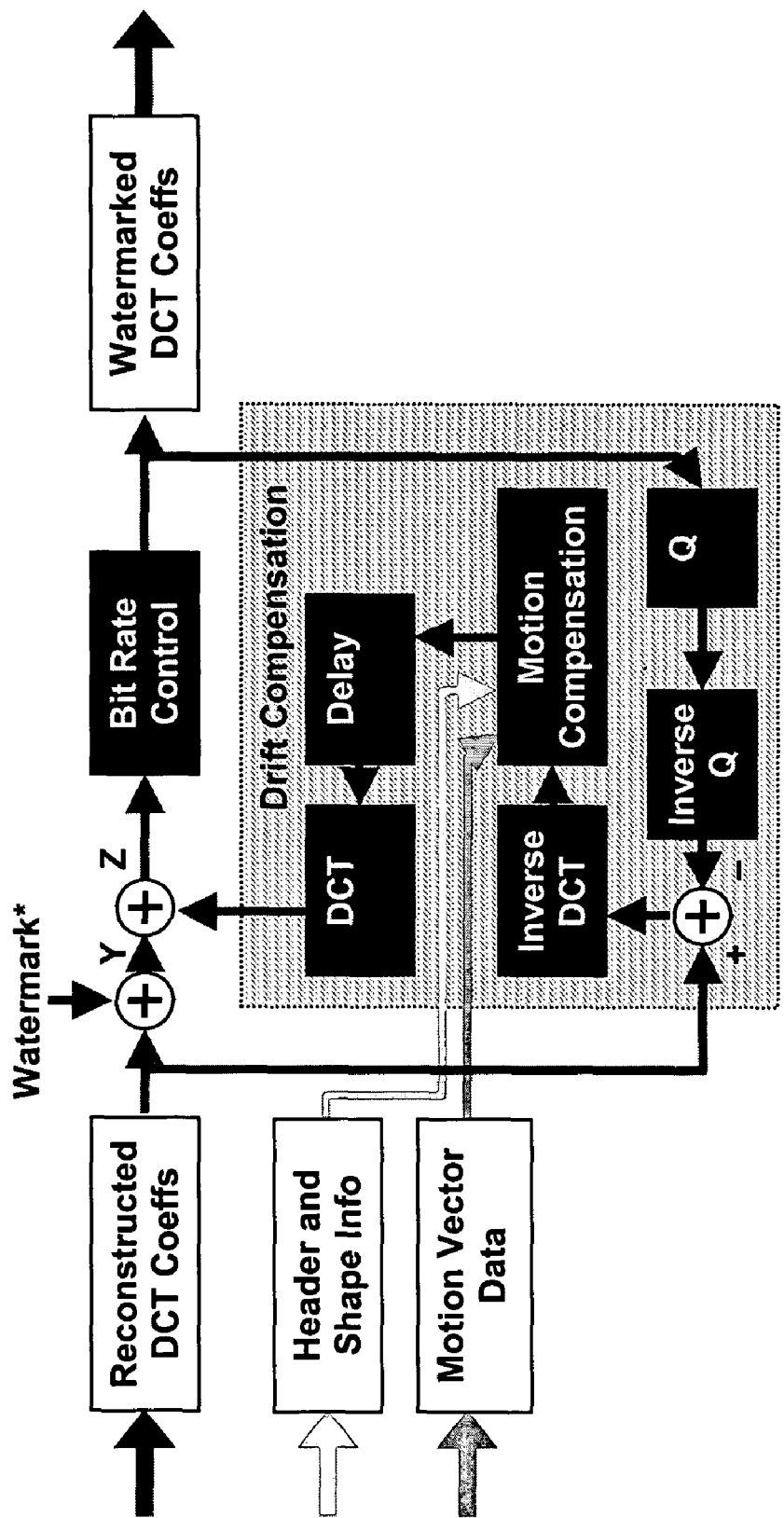
FIG. 7 is a block diagram illustrating an example of drift compensation for watermarking compressed video using data from the compressed bit stream.

Here, a spatial domain drift compensator is employed to cope with unwanted interference and visual degradations. In particular, a drift compensator keeps track of the difference between the un-watermarked reference VOP at the encoder and watermarked reference VOP that will be reconstructed at the decoder. Before watermarking an inter-coded VOP, the error signal from the previous VOP is propagated via motion compensation and subtracted from the current VOP. At each VOP, the error signal is updated to include the latest modifications made within the current VOP. Note that, due to the inserted watermark signal and the quantization noise, the error signal cannot be completely eliminated. Feeding back the changes, the system appropriately tracks the difference between the states of the encoder and the decoder, at all times. A block diagram for the drift compensator is shown in FIG. 7.

Design considerations have led to shortcomings in the implementation of the drift compensation mechanism: i) Drift compensator tracks the drift in the spatial domain to simplify the motion compensation process. Motion compensation, thus the whole process, can be implemented in the DCT coefficient domain. This eliminates the transform overhead, and reduces computational requirements. ii) DC coefficients are left unaltered during watermark insertion. As a result, when the drift error has a non-zero DC value it cannot be compensated. Since the watermark signal is zero mean in the first place, this problem is often mitigated.

2.B.1.c Bit-Rate Control

Most digital watermarks that are created according to the spread-spectrum techniques contain significant mid to high frequency contents. This limits the interference from the host signal whose energy is concentrated in low to mid frequency bands. The spread-spectrum watermark used in this paper also has similar characteristics, i.e. contain significant mid to high frequencies. The mismatch between the frequency characteristics of the watermark and host signals creates a problem for the compressed domain representation of the watermarked signal. Watermarked host signal with high frequency content often requires more bits to represent. A small increase in bit-rate may be tolerable in some applications, but a bit-rate control algorithm should keep the bit-rate within the pre-specified limits.

In our approach to bit rate control, the watermark signal is added to a block of the VOP. If the watermarked block requires more bits than those allocated, quantized DCT coefficients are selectively eliminated until the target bit-budget is met. In particular, the quantized DCT coefficient with the minimum absolute value is set to zero. This decreases the number of non-zero DCT coefficients, and gradually reduces the number of bits required for the block. The algorithm does not differentiate between the host signal and the watermark signal during elimination and the zeroing step is applied to the whole watermarked block, not just the watermark. As a result, in some instances, host signal quality is sacrificed instead of reducing the amount of embedded watermark. This functionality is especially useful for lower bit-rate applications, unlike prior techniques where a few coefficients can be marked.

There are a number of alternative strategies for determining bit-budget of each block. Bit allocation is a challenging problem in compression systems and various optimization methods have been developed. Herein, the problem is revisited in the watermarking context, where the fidelity of the embedded watermark signal is traded with that of the host signal through bit allocation. Below we introduce two heuristic approaches and defer the theoretical optimization problem for future research. First method is a simple strategy which piggy-backs to the encoder's bit-rate control algorithm. In particular, bit-budget of a block ($B_{new}$) is determined as the number of original bits times one plus the permitted rate of increase (R), plus any unused bits from earlier blocks:

$$B_{new} = B_{orig}(1+R) + \Delta \qquad (10)$$

where $\Delta$ denotes the number of bits that have been assigned to a previous block but have not been used by that block.

The bit-allocation algorithms used by encoders, such as TM5, often allocate more bits to textured areas of the VOP. Our allocation strategy also favors these areas by allocating more bits for the watermark (and thus, allowing a stronger watermark to be embedded) in textured areas. This behavior is in agreement with the local gain adaptation algorithm (Section 2B), which increases the gain in textured areas.

The second bit-allocation method aims to explicitly use the result of the gain adaptation algorithm and allows for a more flexible approach. First, we allocate available additional bits (Allocation) among blocks within a VOP according to their local watermark gain factor ($G_{local}$) In particular, at each step the remaining additional bits are shared among remaining blocks in a manner proportional to each block's watermark local gain factor. In addition, we factor in the desired increase (Increase) in our bit-budget calculations. Increase is the difference between the original number of bits and those required by the watermarked block before coefficient elimination. Bit-budget of a block is computed as the original budget plus the average of the allocated and desired increases. This method allows for occasional local increases in the budget without missing global targets. In our experiments, this approach provided better overall visual quality and/or better watermark robustness.

$$B_{new} = B_{orig} + \left( \frac{\text{Increase} + \text{Allocation}}{2} \right)$$

$$\text{Increase} = B_{watermarked} - B_{orig}$$

$$\text{Allocation} = \frac{G_{local}}{\sum G_{local}} \sum B_{orig} * R$$

2.B.2 Watermark Detection

Since a spatial watermark was used, watermark detection is performed after decompressing the bit-stream. The detection is performed on the luminance component in two steps for each VOP: First, the detector is synchronized by resolving the scale and orientation. Next the watermark message is read and decoded.

In the current implementation, only the template imposed by the embedding of the synchronization signal g(x,y) is utilized for synchronization. Hereunder, this process is described again. Note that the treatment of the other template is similar, such that the autocorrelation of the whole VOP—computed utilizing FFT—is replaced with the FFT magnitude of the blocks.

The scale and orientation of the VOP is resolved using g(x,y) and the log-polar re-mapping described in Section 0, as follows: First, the VOP is divided into blocks of size N×M, and then all the blocks with fair amount of details are selected for further processing. All areas outside the boundary of a VOP are set to zero. This selective processing of the blocks enhances signal-to-noise ratio (SNR) and reduces the processing time. The SNR can be further enhanced by predicting the host image data and subtracting the prediction from the VOP. Then average magnitude of the FFT of all these blocks is computed and used to calculate the re-mapping described in equation (4). Finally, the linear shifts in equation (4) are detected using a POM filter using the log-polar transform of g(x,y). The calculated scale and orientation are used to invert the geometrical transformation of each N×M block. The origin of the watermark in each N×M block is calculated by matching the FFT of the block to the FFT of the sync signal using a POM filter.

Once the geometric transformation and the origin of the watermark are resolved, a linear correlator can be used to read the watermark. Then, the message is obtained by error correction decoding.

Object Oriented Coding

The method described above can be adapted for object oriented coding of video object planes (VOPs) in an MPEG-4 video bit stream. Each video object plane carries a unique watermark signal, such as a signal with a unique payload corresponding to the VOP. A master synchronization signal is used for all VOPs in the video frame. This method is implemented, for example, using a synchronization signal, such as a constellation of Fourier domain peaks.

Independent coding of the VOPs in MPEG-4 allows each VOP to carry its own payload. A master synchronization signal can be used with all VOPs. The region of this synchronization signal corresponding to the area of the image occupied by the VOP is added to the message signal and used to watermark that VOP. The detection and reading of the watermark proceeds normally, except that the payload is read from the pixels of the local area and not combined with other statistics collected from the other parts of the image. For this approach to be effective, the size of each VOP must be larger than the size of the watermark tile (e.g., 64×64, 128×128, 256×256, etc.).

Interlaced Video

Watermarking interlaced video requires special care, since the DCT coefficients in the bit-stream can be either in frame or field organization. Adding the watermark without paying attention to this organization would destroy the phase of the watermark, and render the watermark undetectable. The organization of watermark has to match that of the DCT coefficients in each macroblock. If the macroblock is in a frame-based DCT organization, the DCT of the normal watermark can be directly added to the DCT coefficients of each block. However, if the macroblock is in a field-based DCT organization, then the even lines of the watermark must first be separated from the odd lines. Next, the even lines are divided into two blocks, DCT transformed, and respectively added to the DCT coefficients of block number 0 and 1. Similarly, the odd lines are divided into two blocks, DCT transformed, and respectively added to the DCT coefficients of block number 2 and 3.

Scalable Video

There are two scalability modes in MPEG-4: temporal and spatial. Temporal scalability allows the decoding of a video sequence at more than one temporal resolution. Similarly, the spatial scalability allows the decoding of a video sequence at more than one spatial resolution. In both type of scalability, the video is encoded into a base layer and one or more enhancement layers. Different resolution is obtained at the decoder by combining the base layer with one or more enhancement layers. For the temporal scalability there is no interaction between the layers during the decoding of the enhancement layer. The temporal resolution is enhanced at the display time simply via interleaving the enhanced layers with the base layer. Therefore, watermarking can be done to all layers in the same way it was previously described. This allows the watermark to be detected from all frames regardless of the decoding resolution.

Watermarking spatially scalable bit-stream is a little-bit more involved, since there is a lot of interaction between the layers during the decoding of the enhancement layer. The re-sampled base layer is used as forward prediction for the decoding of the enhanced layer of a P-VOP. The re-sampled base layer of the current VOP and the enhanced layer of the most recently decoded VOP is used as the backward and forward predictions for the decoding of the enhanced layer of B-VOP, respectively. Therefore, a proper watermarking of the spatially scalable bit-stream takes this prediction into account before watermarking each layer of the bit-stream. This will prevent any drift in quality and will eliminate watermark self-interference. A drift compensation algorithm similar to that used for watermarking non-scalable bit-stream is used for this purpose. The basic idea of such a compensator is to subtract the previously added watermark before adding the new one.

Sprite Coding

Sprites in the context of MPEG-4 are normally large static objects that are coded once and mathematically manipulated later via motion compensation and warping algorithms. Direct watermarking of such an object does not guarantee detection in all frames. The warping operation used later is similar to the geometric distortion often used to attack the watermark. In order to over come this problem, the watermark must be added to the static object the first time it is encoded, and updated every time warping is required. This can be done through the sprite update mode available in MPEG-4. However, before embedding a pre-distorted version of the watermark must be prepared according to the warping parameters, such that when the warping operation is applied to the sprite, the original form of the watermark is restored. Also, the existing watermark on the previously decoded sprite must be subtracted. This step is similar to the drift compensation used with P and B-frames and necessary to avoid accumulation of error.

AC Coefficient Prediction

In some compressed video formats, certain coefficients are predicted from other coefficients within the same frame. For this case, we implemented a method for embedding a watermark signal in predicted transform coefficients in a compressed video signal. This method is used to embed a digital watermark into the predicted coefficients in a compressed video stream more efficiently. In particular, in a compressed video stream in the MPEG-4 video coding standard, AC coefficients in the Discrete Cosine Transform domain of a video block are predicted from a row or column of an adjacent block. The row and column are the top and left most row and column in the block, respectively, excluding the DC coefficient. The inventive method avoids performing inverse prediction of the predicted coefficients by:

1. Calculating the watermark signal for the current block.

2. For the predicted coefficients in the current block, subtracting the watermark signal of the previous block (in particular, the block from which the current block coefficients were predicted) from the watermark signal for the current block for the predicted coefficients to produce a prediction compensated watermark signal. The direction of prediction, including the row or column of coefficients that are predicted, is indicated by the prediction applied to the DC coefficient in the compressed bit stream.

3. Adding the prediction compensated watermark signal to the current block.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for embedding a digital watermark in a compressed video stream comprising:
   receiving a compressed video stream;
   extracting transform domain coefficients from the compressed video stream;
   computing an adaptive watermark signal strength based on an activity estimate of the transform domain coefficients; and
   embedding the adapted watermark signal into the transform domain coefficients;
   wherein computing the activity estimate includes computing activity for a block of transform coefficients and weighting the watermark signal strength for the block based on the activity for the block relative to the activity of other blocks in the video stream.

2. The method of claim 1 wherein the video stream includes one or more separately compressed video objects, and the watermark strength for a block in a video object is weighted based on the activity of the block relative to the activity of other blocks in the same video object.

3. A method for embedding a digital watermark in a compressed video stream comprising:
   receiving a compressed video stream;
   extracting transform domain coefficients from the compressed video stream;
   computing an adaptive watermark signal strength based on an activity estimate of the transform domain coefficients; and
   embedding the adapted watermark signal into the transform domain coefficients, wherein the adaptive watermark signal is computed for non predicted and predicted video data; and wherein the watermark signal strength derived from non-predicted video data is used along with motion information that describes motion between the predicted and non-predicted video data to compute watermark signal strength for predicted video data.

4. The method of claim 3 wherein the motion information is extracted from motion vectors in the compressed video stream.

5. A computer readable medium on which is stored instructions, which, when executed by computer, perform the method of claim 1.

6. A method for embedding a digital watermark in a compressed video stream comprising:
   receiving a compressed video stream;
   extracting transform domain coefficients from the compressed video stream;
   computing an adaptive watermark signal strength based on an activity estimate of the transform domain coefficients; and
   embedding the adapted watermark signal into the transform domain coefficients;
   wherein the activity estimate is derived from energy of transform coefficients extracted from the compressed video stream;
   including:
   for blocks of transform coefficients embedded with the watermark signal, controlling bit rate of the data stream by selectively eliminating non-zero quantized transform coefficients with smallest magnitude in the block according to a bit allocation method that assigns a bit budget per block.

7. The method of claim 3 including:
   extracting prediction information from the compressed video stream, the prediction information including motion vectors; and
   computing the adaptive watermark signal strength based on the prediction information.

8. The method of claim 7 wherein the prediction information includes spatial prediction information from the compressed video stream.

9. The method of claim 7 wherein the prediction information includes temporal prediction information from the compressed video stream.

10. The method of claim 7 wherein the prediction information includes temporal and spatial prediction information from the compressed video stream.

11. A computer readable medium on which is stored instructions, which, when executed by computer, perform the method of claim 6.

12. A computer readable medium on which is stored instructions, which, when executed by computer, perform the method of claim 3.

* * * * *